(12) United States Patent
Morgan

(10) Patent No.: US 12,283,838 B2
(45) Date of Patent: Apr. 22, 2025

(54) REVERSE WIRELESS CHARGING POWER MANAGEMENT

(71) Applicant: Cirrus Logic International Semiconductor Ltd., Edinburgh (GB)

(72) Inventor: Ross C. Morgan, Bathgate (GB)

(73) Assignee: Cirrus Logic Inc., Austin, TX (US)

( * ) Notice: Subject to any disclaimer, the term of this patent is extended or adjusted under 35 U.S.C. 154(b) by 695 days.

(21) Appl. No.: 17/394,782

(22) Filed: Aug. 5, 2021

(65) Prior Publication Data

US 2022/0052544 A1    Feb. 17, 2022

Related U.S. Application Data

(60) Provisional application No. 63/221,724, filed on Jul. 14, 2021, provisional application No. 63/065,809, filed on Aug. 14, 2020.

(51) Int. Cl.
*H02J 50/80*    (2016.01)
*B60L 53/53*    (2019.01)
(Continued)

(52) U.S. Cl.
CPC ...... *H02J 7/00712* (2020.01); *H02J 7/00036* (2020.01); *H02J 50/10* (2016.02);
(Continued)

(58) Field of Classification Search
CPC .... H02J 7/00712; H02J 7/00036; H02J 7/342; H02J 17/00; H02J 5/005; H02J 7/025;
(Continued)

(56) References Cited

U.S. PATENT DOCUMENTS

| 7,518,338 B2* | 4/2009 | Wang | H02J 7/0071 320/125 |
| 7,960,944 B2* | 6/2011 | Hoffman | H02J 3/14 320/107 |

(Continued)

FOREIGN PATENT DOCUMENTS

EP    3832847 A1    6/2021

OTHER PUBLICATIONS

International Search Report and Written Opinion of the International Searching Authority, International Application No. PCT/GB2021/052041, mailed Nov. 10, 2021.
(Continued)

*Primary Examiner* — John T Trischler
(74) *Attorney, Agent, or Firm* — Jackson Walker L.L.P.

(57) ABSTRACT

A system includes a wireless transmission module configured to transmit electrical energy to a wireless receiver module via reverse wireless charging, one or more electronic components other than the wireless transmission module, a battery configured to provide electrical energy to the wireless transmission module and the one or more electronic components, and a battery management module coupled to the battery and the wireless transmission module. The battery management module is configured to determine an amount of power demanded by the wireless transmission module and the one or more electronic components from the battery and dynamically vary power transfer from the wireless transmission module to the wireless receiver module as a function of the amount of power demanded by the one or more electronic components.

10 Claims, 2 Drawing Sheets

(51) Int. Cl.
   *H02J 7/00* (2006.01)
   *H02J 50/10* (2016.01)
   *H04B 5/79* (2024.01)
   *H02J 7/34* (2006.01)

(52) U.S. Cl.
   CPC .............. *H02J 50/80* (2016.02); *B60L 53/53* (2019.02); *H02J 7/342* (2020.01); *H04B 5/79* (2024.01); *Y02B 70/3225* (2013.01); *Y04S 20/222* (2013.01)

(58) Field of Classification Search
   CPC .. H02J 50/00; H02J 50/10; H02J 50/05; H02J 50/12; H02J 50/15; H02J 50/20; H02J 50/23; H02J 50/27; H02J 50/30; H02J 50/40; H02J 50/50; H02J 50/60; H02J 50/70; H02J 50/80; H04B 5/0037
   USPC ............................. 191/10; 320/108; 307/104
   See application file for complete search history.

(56) References Cited

U.S. PATENT DOCUMENTS

| | | | | |
|---|---|---|---|---|
| 8,039,995 | B2* | 10/2011 | Stevens | G05F 1/66 307/104 |
| 8,115,448 | B2* | 2/2012 | John | A61N 1/37252 320/108 |
| 8,138,630 | B2* | 3/2012 | Dibachi | H02J 3/32 307/65 |
| 8,143,842 | B2* | 3/2012 | Tyler | B60L 53/63 320/152 |
| 8,332,078 | B2* | 12/2012 | Narel | B60L 53/12 700/297 |
| 8,332,547 | B2* | 12/2012 | Sugaya | H02J 50/20 713/340 |
| 8,378,634 | B2* | 2/2013 | Kung | H02M 3/156 320/152 |
| 8,410,637 | B2* | 4/2013 | Karaoguz | G06K 7/10346 307/104 |
| 8,436,491 | B2* | 5/2013 | Walley | H02J 50/10 307/104 |
| 8,450,979 | B2* | 5/2013 | Kerr | H02J 7/342 307/64 |
| 8,575,890 | B2* | 11/2013 | Hwang | G08C 17/04 320/108 |
| 8,618,697 | B2* | 12/2013 | Karaoguz | G06K 19/0715 307/104 |
| 8,805,530 | B2* | 8/2014 | John | H04B 5/77 607/34 |
| 8,884,463 | B2* | 11/2014 | Dibachi | H02J 4/00 307/65 |
| 8,929,957 | B2* | 1/2015 | Toncich | H02J 50/80 455/67.11 |
| 9,094,054 | B2* | 7/2015 | Walley | H02J 50/10 |
| 9,095,729 | B2* | 8/2015 | John | A61N 1/3785 |
| 9,101,777 | B2* | 8/2015 | John | H02J 50/80 |
| 9,106,096 | B2* | 8/2015 | Kato | H02J 50/90 |
| 9,124,309 | B2* | 9/2015 | Jung | H01F 38/14 |
| 9,197,070 | B2* | 11/2015 | Jung | H02J 50/80 |
| 9,203,244 | B2* | 12/2015 | Abe | H02J 50/90 |
| 9,210,493 | B2* | 12/2015 | Swanson | G06F 16/60 |
| 9,225,177 | B2* | 12/2015 | Jung | H04B 5/79 |
| 9,306,636 | B2* | 4/2016 | Kwon | H04B 5/79 |
| 9,318,898 | B2* | 4/2016 | John | H02J 50/80 |
| 9,362,986 | B2* | 6/2016 | Karaoguz | H02J 50/12 |
| 9,407,334 | B2* | 8/2016 | Toncich | H02J 50/20 |
| 9,431,839 | B2* | 8/2016 | Suomela | H02J 50/12 |
| 9,461,496 | B1* | 10/2016 | Zhang | H02J 7/0071 |
| 9,461,502 | B2* | 10/2016 | Lee | H04B 5/24 |
| 9,510,078 | B2* | 11/2016 | Swanson | H04R 1/1016 |
| 9,590,448 | B2* | 3/2017 | Wang | H02J 50/10 |
| 9,692,260 | B2* | 6/2017 | Walsh | H02J 50/80 |
| 9,698,628 | B2* | 7/2017 | Cain | G06F 1/3203 |
| 9,728,978 | B2* | 8/2017 | Dibachi | H02J 7/35 |
| 9,728,980 | B2* | 8/2017 | Jung | H01F 38/14 |
| 9,762,085 | B2* | 9/2017 | Von Novak, III | H04B 5/79 |
| 9,788,094 | B2* | 10/2017 | Swanson | H04R 1/1016 |
| 9,806,767 | B2* | 10/2017 | Walley | G06K 7/10207 |
| 9,819,186 | B2* | 11/2017 | Rogers, Jr. | H02J 3/14 |
| 9,843,230 | B2* | 12/2017 | John | H04B 5/77 |
| 9,853,481 | B2* | 12/2017 | Lee | H02J 50/12 |
| 9,860,358 | B2* | 1/2018 | Park | H02J 7/342 |
| 9,954,361 | B2* | 4/2018 | Covic | H02J 3/381 |
| 9,991,748 | B2* | 6/2018 | Yamamoto | H02J 50/80 |
| 10,033,228 | B2* | 7/2018 | Lee | H02J 50/12 |
| 10,110,074 | B2* | 10/2018 | Jung | H01F 38/14 |
| 10,141,756 | B1* | 11/2018 | Venkatasamy | H02J 7/007182 |
| 10,256,661 | B1* | 4/2019 | Lu | H02J 7/342 |
| 10,270,277 | B2* | 4/2019 | Von Novak, III | H02J 50/80 |
| 10,312,697 | B1* | 6/2019 | Stieber | H02J 7/0013 |
| 10,340,750 | B2* | 7/2019 | Muurinen | H02J 50/12 |
| 10,340,751 | B2* | 7/2019 | Jung | H04B 5/263 |
| 10,348,134 | B2* | 7/2019 | Lee | H02J 50/12 |
| 10,348,136 | B2* | 7/2019 | John | A61N 1/3787 |
| 10,404,089 | B2* | 9/2019 | Kasar | H02J 50/10 |
| 10,434,880 | B2* | 10/2019 | Taruya | B60L 58/30 |
| 10,454,271 | B2* | 10/2019 | Covic | H02J 13/00002 |
| 10,498,177 | B2* | 12/2019 | Zeine | H02J 50/80 |
| 10,505,386 | B2* | 12/2019 | Kasar | H04M 1/72412 |
| 10,523,039 | B2* | 12/2019 | Melgar | H02J 7/00034 |
| 10,707,683 | B2* | 7/2020 | Pal | H02J 1/14 |
| 10,804,746 | B2* | 10/2020 | Lee | H02J 50/12 |
| 10,855,099 | B2* | 12/2020 | Kim | H02J 7/342 |
| 10,886,769 | B2* | 1/2021 | Kasar | G06F 1/266 |
| 10,886,771 | B2* | 1/2021 | Kasar | H02J 7/0042 |
| 10,886,784 | B2* | 1/2021 | Lee | H04B 5/79 |
| 10,985,619 | B2* | 4/2021 | Walley | G06K 19/0723 |
| 11,011,946 | B2* | 5/2021 | Lee | H04B 5/24 |
| 11,018,516 | B2* | 5/2021 | Cho | H02J 7/342 |
| 11,050,263 | B2* | 6/2021 | Bae | H02J 50/80 |
| 11,063,442 | B2* | 7/2021 | Crawford | H02J 3/32 |
| 11,121,585 | B2* | 9/2021 | Jung | H01F 38/14 |
| 11,159,061 | B2* | 10/2021 | Muurinen | H02J 50/60 |
| 11,159,064 | B2* | 10/2021 | Lee | H04B 5/79 |
| 11,303,135 | B2* | 4/2022 | Kwon | H04B 5/79 |
| 11,362,542 | B2* | 6/2022 | Park | H02J 7/342 |
| 11,385,694 | B1* | 7/2022 | Foland | H02J 7/0047 |
| 11,418,049 | B2* | 8/2022 | Dai | H02J 50/40 |
| 11,527,906 | B2* | 12/2022 | Yoo | A01K 7/005 |
| 11,575,280 | B2* | 2/2023 | Kim | H02J 7/0068 |
| 11,652,372 | B2* | 5/2023 | Lee | H02J 50/80 320/108 |
| 11,860,698 | B2* | 1/2024 | Foland | B60L 58/10 |
| 11,907,034 | B2* | 2/2024 | Sivaramakrishnan | G06F 1/329 |
| 11,929,626 | B2* | 3/2024 | Yu | H02J 7/342 |
| 11,962,180 | B2* | 4/2024 | Marchais | H02J 7/007 |
| 11,973,353 | B2* | 4/2024 | Kim | H02J 50/40 |
| 11,979,032 | B2* | 5/2024 | Choi | H02J 50/40 |
| 12,100,968 | B2* | 9/2024 | Shi | H02J 50/40 |
| 2007/0021140 | A1* | 1/2007 | Keyes, IV | H02J 50/20 455/522 |
| 2007/0247107 | A1* | 10/2007 | Wang | H02J 7/0071 320/107 |
| 2008/0300660 | A1* | 12/2008 | John | H04B 1/40 607/61 |
| 2009/0058361 | A1* | 3/2009 | John | H02J 50/80 307/104 |
| 2009/0140692 | A1* | 6/2009 | Hwang | H02J 7/342 320/108 |
| 2009/0251008 | A1* | 10/2009 | Sugaya | G06F 1/266 307/104 |
| 2009/0307390 | A1* | 12/2009 | Bennett | G06F 1/266 710/36 |
| 2009/0322158 | A1* | 12/2009 | Stevens | H02J 50/12 307/104 |
| 2010/0141205 | A1* | 6/2010 | Tyler | B60L 53/65 320/109 |
| 2010/0145535 | A1* | 6/2010 | Tyler | G06Q 50/40 700/295 |
| 2010/0151808 | A1* | 6/2010 | Toncich | H02J 50/12 455/343.1 |

(56) References Cited

U.S. PATENT DOCUMENTS

| | | | | |
|---|---|---|---|---|
| 2010/0264875 A1* | 10/2010 | Hoffman | H02J 9/005 | 320/111 |
| 2010/0270968 A1* | 10/2010 | Reese | H02J 7/0069 | 320/103 |
| 2011/0068624 A1* | 3/2011 | Dibachi | H02J 7/35 | 324/427 |
| 2011/0074360 A1* | 3/2011 | Kerr | H02J 7/0068 | 307/66 |
| 2011/0127843 A1* | 6/2011 | Karaoguz | G06K 7/10207 | 307/104 |
| 2011/0127844 A1* | 6/2011 | Walley | G06K 7/10207 | 307/104 |
| 2011/0127952 A1* | 6/2011 | Walley | G06K 19/0715 | 320/108 |
| 2011/0127953 A1* | 6/2011 | Walley | G06K 19/0723 | 320/108 |
| 2011/0130093 A1* | 6/2011 | Walley | H02J 50/10 | 307/104 |
| 2012/0007441 A1* | 1/2012 | John | A61N 1/3785 | 307/104 |
| 2012/0041613 A1* | 2/2012 | Narel | B60L 58/40 | 700/297 |
| 2012/0086386 A1* | 4/2012 | Dibachi | H02J 3/32 | 320/101 |
| 2012/0206096 A1* | 8/2012 | John | H04B 5/79 | 320/108 |
| 2012/0217936 A1* | 8/2012 | Kung | H02M 3/156 | 320/163 |
| 2013/0015705 A1* | 1/2013 | Abe | H02J 50/402 | 307/29 |
| 2013/0043738 A1* | 2/2013 | Park | H02J 50/12 | 307/104 |
| 2013/0099586 A1* | 4/2013 | Kato | H02J 50/90 | 307/104 |
| 2013/0119778 A1* | 5/2013 | Jung | H02J 50/80 | 307/104 |
| 2013/0134923 A1* | 5/2013 | Smith | H02J 7/02 | 320/103 |
| 2013/0154381 A1* | 6/2013 | Cain | G06F 1/3203 | 307/104 |
| 2013/0229066 A1* | 9/2013 | Karaoguz | H02J 50/80 | 307/104 |
| 2014/0062395 A1* | 3/2014 | Kwon | H04B 5/79 | 320/108 |
| 2014/0084682 A1* | 3/2014 | Covic | H02J 13/00002 | 307/17 |
| 2014/0103734 A1* | 4/2014 | Walsh | G01R 1/20 | 307/104 |
| 2014/0117772 A1* | 5/2014 | Karaoguz | H02J 50/12 | 307/104 |
| 2014/0117921 A1* | 5/2014 | Suomela | H02J 50/10 | 320/103 |
| 2014/0145516 A1* | 5/2014 | Hirosawa | H02J 50/12 | 307/104 |
| 2014/0270227 A1* | 9/2014 | Swanson | H04R 1/1041 | 381/74 |
| 2014/0319925 A1* | 10/2014 | Jung | H04B 5/79 | 307/104 |
| 2014/0319926 A1* | 10/2014 | Jung | H02J 50/12 | 307/104 |
| 2014/0327409 A1* | 11/2014 | Lee | H04B 5/24 | 320/137 |
| 2015/0061386 A1* | 3/2015 | Dibachi | H02J 3/32 | 307/23 |
| 2015/0079904 A1* | 3/2015 | Toncich | H02J 50/90 | 455/41.1 |
| 2015/0155718 A1* | 6/2015 | Jung | H02J 50/12 | 307/104 |
| 2015/0233990 A1* | 8/2015 | Lee | H02J 50/12 | 324/76.12 |
| 2015/0303710 A1* | 10/2015 | John | H04B 5/79 | 307/104 |
| 2015/0364925 A1* | 12/2015 | Muurinen | H02J 50/12 | 307/104 |
| 2015/0364946 A1* | 12/2015 | Wang | H02J 50/10 | 455/573 |
| 2016/0057523 A1* | 2/2016 | Swanson | H04R 1/1016 | 381/74 |
| 2016/0064951 A1* | 3/2016 | Yamamoto | H02J 50/80 | 307/104 |
| 2016/0094076 A1* | 3/2016 | Kasar | H02J 7/0042 | 320/103 |
| 2016/0099604 A1* | 4/2016 | Von Novak, III | H02J 7/0042 | 320/108 |
| 2016/0141891 A1* | 5/2016 | Jung | H04B 5/79 | 307/104 |
| 2016/0197495 A1* | 7/2016 | Jung | H02J 50/80 | 307/104 |
| 2016/0204607 A1* | 7/2016 | Rogers, Jr. | H02J 3/28 | 307/31 |
| 2016/0272079 A1* | 9/2016 | Quoc-Tuan | B60L 53/63 | |
| 2016/0315506 A1* | 10/2016 | John | A61N 1/3785 | |
| 2017/0005520 A1* | 1/2017 | Zeine | H02J 50/80 | |
| 2017/0018955 A1* | 1/2017 | Lee | H02J 50/12 | |
| 2017/0078783 A1* | 3/2017 | Swanson | G06F 16/60 | |
| 2017/0141624 A1* | 5/2017 | White, II | H02J 50/12 | |
| 2017/0262007 A1* | 9/2017 | Zhiwu | G05F 1/66 | |
| 2018/0029498 A1* | 2/2018 | Taruya | B60L 58/40 | |
| 2018/0041622 A1* | 2/2018 | Park | H04M 1/72412 | |
| 2018/0069419 A1* | 3/2018 | Von Novak, III | H02J 50/90 | |
| 2018/0090939 A1* | 3/2018 | Pal | F25B 49/00 | |
| 2018/0115185 A1* | 4/2018 | John | A61N 1/3785 | |
| 2018/0212455 A1* | 7/2018 | Kasar | G06F 1/266 | |
| 2018/0254633 A1* | 9/2018 | Covic | H02J 13/00002 | |
| 2018/0351410 A1* | 12/2018 | Lee | H02J 50/12 | |
| 2019/0052113 A1* | 2/2019 | Melgar | H02J 50/80 | |
| 2019/0097430 A1* | 3/2019 | Bae | H02J 7/00034 | |
| 2019/0104473 A1* | 4/2019 | Chun | H04W 52/0235 | |
| 2019/0222073 A1* | 7/2019 | Lee | H02J 50/10 | |
| 2019/0267850 A1* | 8/2019 | Jung | H04B 5/263 | |
| 2019/0273403 A1* | 9/2019 | Muurinen | H02J 50/10 | |
| 2019/0296585 A1* | 9/2019 | Lee | H04B 5/79 | |
| 2019/0305827 A1* | 10/2019 | Walley | G06K 7/10346 | |
| 2019/0386507 A1* | 12/2019 | Kasar | H02J 7/342 | |
| 2019/0393735 A1* | 12/2019 | Lee | H02J 50/80 | |
| 2020/0083737 A1* | 3/2020 | Dai | H02J 50/10 | |
| 2020/0091756 A1* | 3/2020 | Yoo | A01K 7/025 | |
| 2020/0112195 A1* | 4/2020 | Kasar | H04M 1/72412 | |
| 2020/0119581 A1* | 4/2020 | Kim | H02J 7/0068 | |
| 2020/0185976 A1* | 6/2020 | Kwon | H04B 5/79 | |
| 2020/0220367 A1* | 7/2020 | Cho | G06F 3/0482 | |
| 2020/0227947 A1* | 7/2020 | Lee | H02J 50/12 | |
| 2020/0266661 A1* | 8/2020 | Park | G06F 1/189 | |
| 2020/0343733 A1* | 10/2020 | Crawford | F03D 9/10 | |
| 2021/0083515 A1* | 3/2021 | Kim | H02J 7/342 | |
| 2021/0103539 A1* | 4/2021 | Woodbury | G06F 1/266 | |
| 2021/0203191 A1* | 7/2021 | Kim | H02J 50/23 | |
| 2021/0234412 A1* | 7/2021 | Walley | H02J 50/10 | |
| 2021/0273496 A1* | 9/2021 | Lee | H02J 50/80 | |
| 2021/0288527 A1* | 9/2021 | Bae | H02J 7/00034 | |
| 2022/0037925 A1* | 2/2022 | Yu | H02J 50/80 | |
| 2022/0045556 A1* | 2/2022 | Lee | H04B 5/79 | |
| 2022/0052546 A1* | 2/2022 | Morgan | H02J 7/342 | |
| 2022/0131422 A1* | 4/2022 | Choi | H02J 50/60 | |
| 2022/0216737 A1* | 7/2022 | Park | H02J 50/80 | |
| 2022/0278557 A1* | 9/2022 | Ding | H01F 38/14 | |
| 2022/0278561 A1* | 9/2022 | Choi | H02J 50/90 | |
| 2022/0320999 A1* | 10/2022 | Marchais | H02J 7/007 | |
| 2022/0329096 A1* | 10/2022 | Wang | H02J 50/80 | |
| 2022/0416557 A1* | 12/2022 | Yin | H02J 7/00712 | |
| 2023/0054549 A1* | 2/2023 | Foland | B60L 58/16 | |
| 2023/0059432 A1* | 2/2023 | Shi | H02J 50/80 | |
| 2023/0060984 A1* | 3/2023 | Perry | H02J 50/80 | |
| 2023/0103280 A9* | 3/2023 | Ding | H02J 50/12 | 320/108 |
| 2023/0238828 A1* | 7/2023 | Ju | H02J 50/90 | 320/108 |
| 2023/0409098 A1* | 12/2023 | Sivaramakrishnan | G06F 1/3253 | |

(56) References Cited

U.S. PATENT DOCUMENTS

| | | | |
|---|---|---|---|
| 2024/0211009 A1* | 6/2024 | Foland | G06N 3/08 |
| 2024/0250324 A1* | 7/2024 | Beardsworth | H01M 10/486 |
| 2024/0250550 A1* | 7/2024 | Beardsworth | G01K 7/16 |

OTHER PUBLICATIONS

Combined Search and Examination Report under Sections 17 and 18(3), UKIPO, Application No. GB2111362.6, mailed Jan. 24, 2022.

\* cited by examiner

REVERSE WIRELESS CHARGING POWER MANAGEMENT

RELATED APPLICATION

The present disclosure claims priority to U.S. Provisional Patent Application Ser. No. 63/065,809, filed Aug. 14, 2020, and U.S. Provisional Patent Application Ser. No. 63/221,724, filed Jul. 14, 2021, each of which is incorporated by reference herein in its entirety.

FIELD OF DISCLOSURE

The present disclosure relates in general to circuits for electronic devices, including without limitation personal audio devices such as wireless telephones and media players, and more specifically, a power supply architecture with reverse wireless charging.

BACKGROUND

Portable electronic devices, including wireless telephones, such as mobile/cellular telephones, tablets, cordless telephones, mp3 players, smart watches, health monitors, and other consumer devices, are in widespread use. Such a portable electronic device may often support wireless power transfer via inductive charging.

For example, under the Qi™ wireless power transfer (WPT) specification, power transfer is achieved via magnetic induction between a primary coil of a transmitter and a secondary coil of a receiver to wirelessly transfer power from the transmitter to the receiver for the purposes of powering a host device (e.g., a portable electronic device) and/or charging a battery of the host device. While wireless charging is often seen as from an alternating current (AC) connected base station comprising the transmitter to a host device comprising the receiver, charging may also take place from a host device to a host device accessory, such as earbuds or a headset, for example, in what is often referred to as "reverse wireless charging."

In reverse wireless charging, rectifier circuitry of the receiver of the host device may be used as inverter circuitry, such that an inductive-capacitive tank of the host device receiver effectively becomes an inductive-capacitive tank of a transmitter for the host device. Presently, the WPT specification provides that if reverse wireless charging is enabled, the power management system may not be able to efficiently manage peak power delivery to various system loads of the host device. In particular, the WPT specification protects the receiver side of a wireless power transfer, and thus the receiver is "in control" of power transfer from the transmitter, and the receiver may renegotiate its power needs at any time. The transmitter must adhere to the negotiated power demands of the receiver or the power transfer link between the transmitter and the receiver may be dropped and require renegotiation. In the event that the transmitter is unable to provide the power demands of the receiver, foreign-object detection circuitry of the receiver may cause a drop in the power transfer link in order to protect the receiver from the possibility of a foreign object present between the transmitter and the receiver that may overheat. Alternatively, a specification-provisioned reactive control loop in which the received power is communicated back to the transmitter which must then compare this versus the transmitted power and send an acknowledgement message if this is expected could help ride through unexpected changes in transmitted power. However such an approach may be slow and would delay genuine foreign object detection as well as result in additional communication messages between transmitter and receiver, particularly as the peak system load could change very frequently, which will reduce charging efficiency.

Accordingly, to ensure compliance with the WPT standard and to prevent the power transfer link from dropping, in existing approaches, if a battery of a host device is unable to provide adequate power to the transmitter for wireless power transfer, power management circuitry of the host device may throttle power to system loads other than the transmitter in order to prevent battery brownout or to avoid reliance on a slow reactive control loop to ride through dynamic peak system load demands. Such throttling in favor of the power demands of the transmitter may be undesirable.

SUMMARY

In accordance with the teachings of the present disclosure, one or more disadvantages and problems associated with existing approaches to reverse wireless charging may be reduced or eliminated.

In accordance with embodiments of the present disclosure, a system may include a wireless transmission module configured to transmit electrical energy to a wireless receiver module via reverse wireless charging, one or more electronic components other than the wireless transmission module, a battery configured to provide electrical energy to the wireless transmission module and the one or more electronic components, and a battery management module coupled to the battery and the wireless transmission module. The battery management module may be configured to determine an amount of power demanded by the wireless transmission module and the one or more electronic components from the battery and dynamically vary power transfer from the wireless transmission module to the wireless receiver module as a function of the amount of power demanded by the one or more electronic components. In some embodiments, battery management module may be further configured to cause the wireless transmission module to communicate a message to the wireless receiver module indicating that power transfer from the wireless transmission module to the wireless receiver module is reduced.

In accordance with these and other embodiments of the present disclosure, a device configured for wireless power charging may include a wireless transmission module configured to wirelessly transmit electrical energy to a wireless receiver module. The device may be configured to monitor for a query from the wireless receiver module. If the query is due to a known transient decrease in power level of electrical energy delivered from the wireless transmission module to the wireless receiver module, transmit an acknowledgment and resume power transmission from the wireless transmission module to the wireless receiver module when the transient has passed, and if the query is due to a non-transient decrease in power level of electrical energy delivered from the wireless transmission module to the wireless receiver module, disable the wireless receiver module from receiving electrical energy from the wireless transmission module.

In accordance with these and other embodiments of the present disclosure, a method is provided for use in a system including a wireless transmission module configured to transmit electrical energy to a wireless receiver module via reverse wireless charging, one or more electronic components other than the wireless transmission module, and a battery configured to provide electrical energy to the wireless transmission module and the one or more electronic components. The method may include determining an amount of power demanded by the wireless transmission module and the one or more electronic components from the battery and dynamically varying power transfer from the wireless transmission module to the wireless receiver module as a function of the amount of power demanded by the one or more electronic components. In some embodiments, the method may further include causing the wireless transmission module to communicate a message to the wireless receiver module indicating that power transfer from the wireless transmission module to the wireless receiver module is reduced.

In accordance with these and other embodiments of the present disclosure, a method may include, in a device configured for wireless power charging and having wireless transmission module configured to wirelessly transmit electrical energy to a wireless receiver module: monitoring for a query from the wireless receiver module; if the query is due to a known transient decrease in power level of electrical energy delivered from the wireless transmission module to the wireless receiver module, transmitting an acknowledgment and resume power transmission from the wireless transmission module to the wireless receiver module when the transient has passed; and if the query is due to a non-transient decrease in power level of electrical energy delivered from the wireless transmission module to the wireless receiver module, disabling the wireless receiver module from receiving electrical energy from the wireless transmission module.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
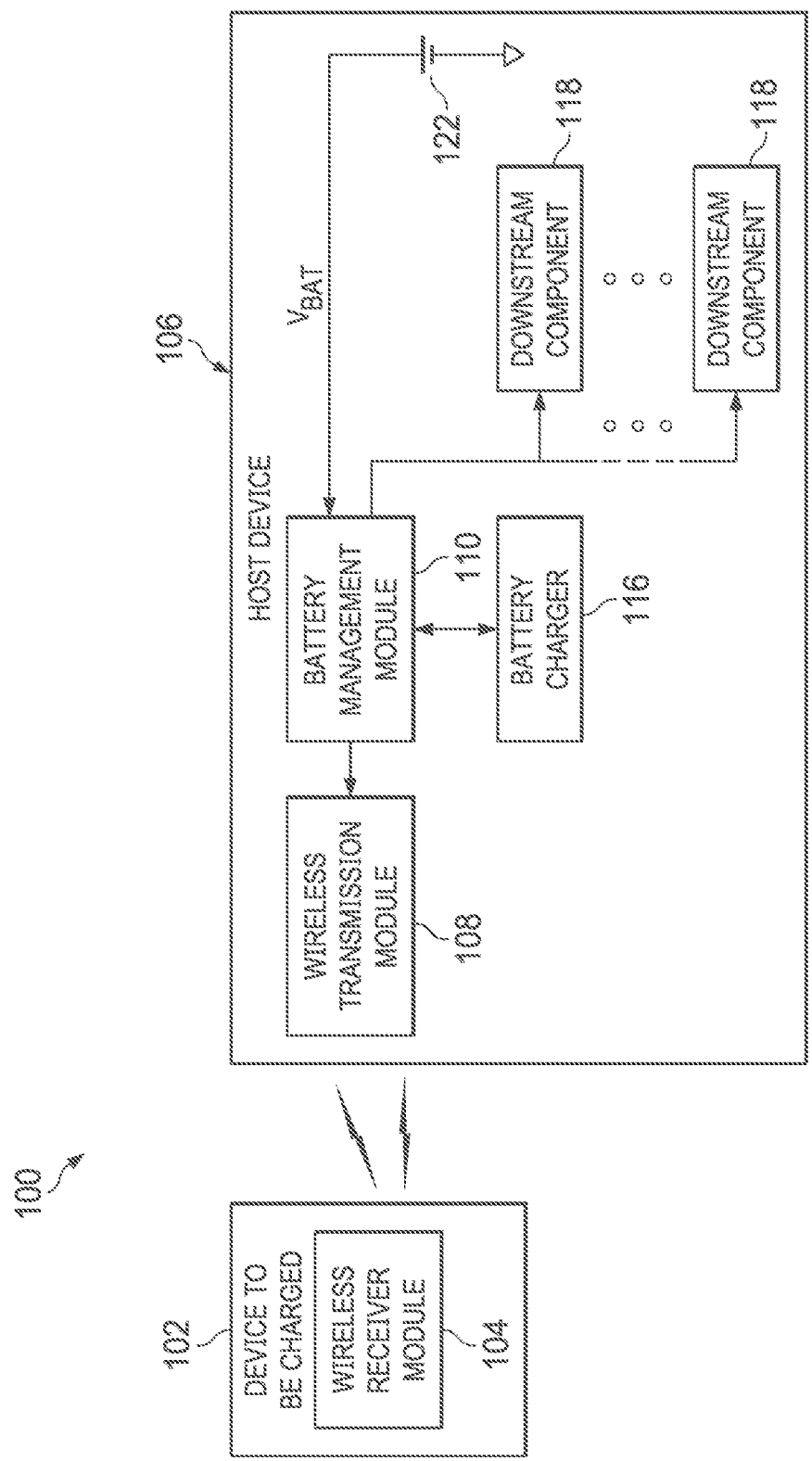
FIG. 1 illustrates an example wireless power system for reverse wireless charging, in accordance with embodiments of the present disclosure.

FIG. 1 illustrates an example wireless power system 100, in accordance with embodiments of the present disclosure. As shown in FIG. 1, wireless power system 100 may include a device-to-be-charged 102 and a host device 106. In operation, as described in greater detail below, host device 106 may be configured to wirelessly transmit electrical energy to device-to-be-charged 102, which may be used to power devices integral to device-to-be-charged 102 and/or charge one or more energy storage devices (e.g., batteries) integral to device-to-be-charged 102. For example, in some embodiments, when device-to-be-charged 102 is placed in proximity to host device 106, inductive coupling between host device 106 and device-to-be-charged 102 may enable transfer of electrical energy from host device 106 to device-to-be-charged 102.

In some embodiments, host device 106 may comprise a portable electronic device (e.g., a smart phone or tablet) with wireless transmission ability and device-to-be-charged 102 may include an accessory device for such portable electronic device, such as wireless earbuds.

As shown in FIG. 1, device-to-be-charged 102 may include a wireless receiver module 104. Wireless receiver module 104 may comprise any system, device, or apparatus configured to wirelessly receive electrical energy (e.g., via inductive coupling) from a corresponding wireless transmission module (e.g., wireless transmission module 108). In some embodiments, wireless receiver module 104 may comprise a rectifier, in addition to a receiver coil/antenna, a tuning network, and/or other components. Further, wireless receiver module 104 may also be configured to wirelessly transmit to and receive from the corresponding wireless transmission module information and/or data for negotiating power transfer from such corresponding wireless transmission module to wireless receiver module 104 (e.g., in accordance with the WPT standard).

As also shown in FIG. 1, host device 106 may include a wireless transmission module 108, a battery management module 110, battery charger 116, one or more downstream components 118, and a battery 122.

Wireless transmission module 108 may comprise any system, device, or apparatus configured to wirelessly transmit electrical energy (e.g., via inductive coupling) to a corresponding wireless receiver module (e.g., wireless receiver module 104). Further, in some embodiments, wireless transmission module 108 may be configured to operate as a wireless receiver module configured to receive wirelessly transmitted energy, for example from an inductive charging mat. Thus, when wireless transmission module 108 wirelessly transmits energy to a corresponding wireless receiver module, wireless transmission module 108 may be said to be performing reverse wireless charging to such corresponding wireless receiver module. Further, wireless transmission module 108 may also be configured to wirelessly transmit to and receive from the corresponding wireless receiver module information and/or data for negotiating power transfer from wireless transmission module 108 to such corresponding wireless receiver module 104 (e.g., in accordance with the WPT standard).

Battery 122 may include any system, device, or apparatus configured to convert chemical energy stored within battery 122 to electrical energy for powering downstream components 118 and wireless transmission module 108. Further, battery 122 may also be configured to recharge, in which it may convert electrical energy received by battery 122 into chemical energy to be stored for later conversion back into electrical energy. For example, in some embodiments, battery 122 may comprise a lithium-ion battery.

Downstream components 118 may include any suitable functional circuits or devices of host device 106, including without limitation processors, audio coder/decoders, amplifiers, display devices, audio transducers, etc.

Battery charger 116 may include any system, device, or apparatus configured to charge a battery, for example by delivering electrical energy to battery 122 (e.g., via battery management module 110) in order that battery 122 converts the electrical energy to chemical energy that is stored in such battery. In some embodiments, battery charger 116 may include a wired charger configured to draw electrical energy from an electrical power outlet or from a power bank. In other embodiments, battery charger 116 may include a wireless charger configured to draw electrical energy via inductive coupling from a wireless charging pad or similar device. In some embodiments, host device 106 may include both a wired charger and a wireless charger. While FIG. 1 depicts battery charger 116 integral to host device 106, in some embodiments, all or a portion of battery charger 116 may be external to host device 106.

Battery management module 110 may include any system, device, or apparatus configured to control transfer of electrical energy from battery 122 to downstream components 118 and wireless transmission module 108 based on power demands of wireless transmission module 108, power demands of downstream components 118, telemetry information associated with battery 122, and/or other parameters. In some embodiments, battery management module 110 may include one or more power converters configured to convert battery voltage $V_{BAT}$ into one or more supply voltages for powering downstream components 118 and/or wireless transmission module 108. Accordingly, in such embodiments, battery management module 110 may include appropriate control circuitry for commutating or otherwise controlling switches integral to such one or more power converters in order to regulate voltages generated by such one or more power converters to appropriate or desired levels.

In operation, as described in greater detail below, battery management module 110 may be configured to disable and/or reduce power allocated to wireless transmission module 108 when power demanded from downstream components 118 exceeds a configurable power limit, in order to reduce or eliminate throttling of downstream components 118 or brownout of battery 122. Accordingly, peak power demands of downstream components 118 may be serviced, in favor of wireless transmission module 108, while avoiding or reducing the likelihood of brownout.

The configurable power limit may be use-case dependent, and may take into account one or more parameters associated with battery 122 and/or host device 106, including without limitation state of charge of battery 122, state of health of battery 122, a temperature associated with battery 122, a daily depth of discharge of battery 122, a charging rate of battery 122, a discharging rate of battery 122, a storage capacity of battery 122, an energy density of battery 122, a specific power of battery 122, a cell voltage of battery 122, a cycle life of battery 122, a round-trip efficiency of battery 122, and/or other parameters. Such parameters may have a bearing on an ability of battery 122 to deliver energy for peak power demands of downstream components 118. Measurement of power consumption of downstream components 118 may be made using any suitable approach, including use of a current sense resistor, a voltage sense resistor, and analog-to-digital converters, as is known in the art. Further, mechanisms by which power delivery to wireless transmission module 108 may be disabled or reduced may be defined by the WPT specification and may include, without limitation, control of a voltage input to wireless transmission module 108, inverter frequency for wireless transmission module 108, inverter switching duty cycle for wireless transmission module 108, and/or inverter switch phasing for wireless transmission module 108.

Further, to enable such scheme of reducing power delivered to wireless transmission module 108, battery management module 110 may also be configured to cause wireless transmission module 108 to transmit a message to wireless receiver module 104 regarding the reduced power to wireless transmission module 108, such that wireless receiver module 104 may temporarily disable any foreign-object detection signal or other state relating to sudden change in power in order to avoid repeatedly dropping and re-establishing the wireless power transfer link and/or repeatedly notifying the user of the sudden change in power.

Such message may be communicated by wireless transmission module 108 to wireless receiver module 104 either before, during, or after the reduction in power to wireless transmission module 108. Communications via the existing WPT specification may be slower than desired, and thus a custom frequency-shift keying (FSK) message may be used instead (e.g., reducing a number of cycles of power signal frequency encode bits, as well as reducing the number of bits in the message). In some embodiments, message format for such message may be as per a response message to simplify decoding of the message at wireless receiver module 104. In some embodiments, such message may be initiated by wireless transmission module 108 during a power transfer phase without interaction by wireless receiver module 104. In other embodiments, such message may comprise a simple on/off toggle. In these and other embodiments, such message may include payload information regarding the magnitude of the power reduction and/or the duration for which the power is being reduced.

In alternative approaches, wireless transmission module 108 may communicate such message via a custom side-band link with reduced latency, such as Bluetooth Low Energy link, to allow such message to typically be communicated ahead of the reduction in power to wireless transmission module 108.

An alternative approach to avoid or mitigate disconnects and reconnects (and/or user notifications of a decrease in power) occurring on the wireless power transfer link is to require wireless transmission module 108 to acknowledge a foreign-object detection message, End Power Transfer message (with indication of foreign object in payload), and/or other proprietary message which, for example, communicates an unexpected drop in power from wireless receiver module 104, before power to wireless transmission module 108 disables wireless charging. In this case, wireless transmission module 108 may choose to acknowledge a true foreign-object detection message (or similar proprietary message) versus a (potentially) false foreign-object detection message that may occur during a period in which wireless transmission module 108 is intentionally reducing power to wireless receiver module 104.

The reverse wireless charging power management approaches described above may apply to both the case in which wireless transmission module 108 sources the energy transferred to wireless receiver module 104 from battery 122 and the case in which charger 116 is supplying energy to components of host device 106 such that wireless transmission module 108 sources the energy transferred to wireless receiver module 104 from charger 116 in addition to or in lieu of battery 122.

Figure 2:
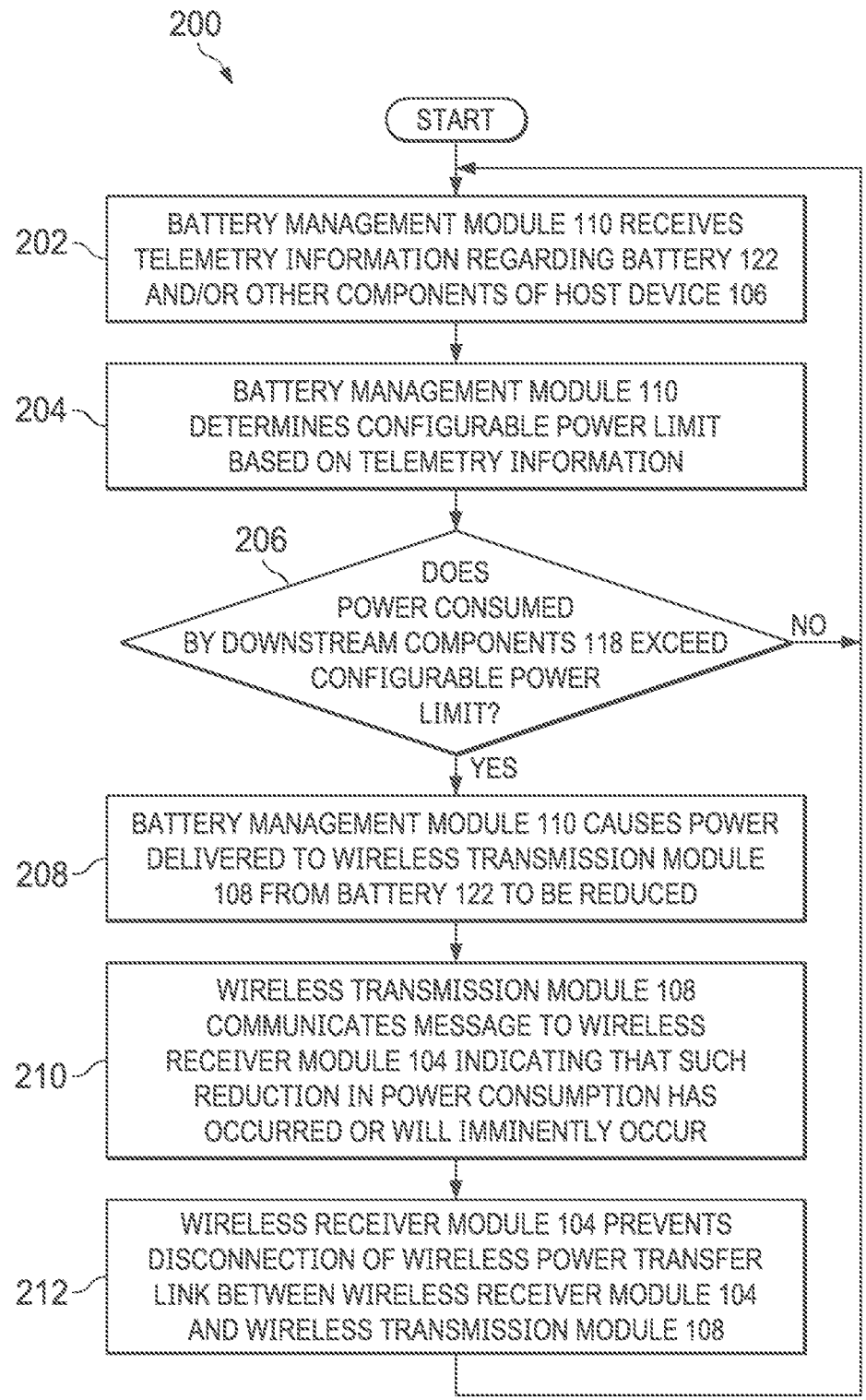
FIG. 2 illustrates a flow chart of an example method for reverse wireless charging power management, in accordance with embodiments of the present disclosure.

FIG. 2 illustrates a flow chart of an example method 200 for reverse wireless charging power management, in accordance with embodiments of the present disclosure. According to certain embodiments, method 200 may begin at step 202. As noted above, teachings of the present disclosure may be implemented in a variety of configurations of wireless power system 100 as shown in FIG. 1. As such, the preferred initialization point for method 200 and the order of the steps comprising method 200 may depend on the implementation chosen.

At step 202, battery management module 110 may receive telemetry information regarding battery 122 and/or other components of host device 106. Such telemetry information may include, without limitation, battery voltage $V_{BAT}$ generated by battery 122, state of charge of battery 122, state of health of battery 122, or any other suitable information. At step 204, based on such telemetry information, battery management module 110 may determine a configurable power limit. Such configurable power limit may represent a maximum power that battery 122 may deliver without browning out.

At step 206, battery management module 110 may determine if power consumed by downstream components 118 exceeds the configurable power limit. If power consumed by downstream components 118 exceeds the configurable power limit, method 200 may proceed to step 208. Otherwise, method 200 may proceed again to step 202.

At step 208, responsive to power consumed by downstream components 118 exceeding the configurable power limit, battery management module 110 may cause power delivered to wireless transmission module 108 from battery 122 to be reduced. At step 210, responsive to such reduction in power consumption, wireless transmission module 108 may communicate a message to wireless receiver module 104 indicating that such reduction in power consumption has occurred or will imminently occur. At step 212, in response to receipt of such message, wireless receiver module 104 may prevent disconnection of a wireless power transfer link between wireless receiver module 104 and wireless transmission module 108 that may occur as a result of wireless transmission module 108 failing to transfer a negotiated amount of power to wireless receiver module 104. For example, as described above, in some embodiments, wireless receiver module 104 may temporarily disable foreign-object detection or other state relating to sudden change in power when power consumption by wireless transmission module 108 is reduced by battery management module 110.

After completion of step 212, method 200 may proceed again to step 202.

Although FIG. 2 discloses a particular number of steps to be taken with respect to method 200, it may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using wireless power system 100 components thereof, or any other suitable system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in FIG. 1 and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system, comprising:
   a wireless transmission module configured to transmit electrical energy to a wireless receiver module via reverse wireless charging;
   one or more electronic components other than the wireless transmission module;
   a battery configured to provide electrical energy to the wireless transmission module and the one or more electronic components; and
   a battery management module coupled to the battery and the wireless transmission module and configured to:
   determine an amount of power demanded by the wireless transmission module and the one or more electronic components from the battery;
   dynamically vary power transfer from the wireless transmission module to the wireless receiver module as a function of the amount of power demanded by the one or more electronic components;

reduce power transfer from the wireless transmission module to the wireless receiver module when the amount of power demanded by the one or more electronic components increases above a configurable power limit; and cause the wireless transmission module to communicate a message to the wireless receiver module indicating that power transfer from the wireless transmission module to the wireless receiver module is reduced;

wherein responsive to the message, the wireless receiver module prevents disconnection of the wireless power transfer link between the wireless transmission module and the wireless receiver module by disabling a state of the system relating to sudden change in power.

2. The system of claim 1, wherein the battery management module is further configured to:

receive telemetry information regarding the battery; and set the configurable power limit based on the telemetry information.

3. The system of claim 2, wherein the telemetry information comprises one or more of a state of charge of the battery, a state of health of the battery, a temperature associated with the battery, a daily depth of discharge of the battery, a charging rate of the battery, a discharging rate of the battery, a storage capacity of the battery, an energy density of the battery, a specific power of the battery, a cell voltage of the battery, a cycle life of the battery, and a round-trip efficiency of the battery.

4. The system of claim 1, wherein responsive to the message, the wireless receiver module prevents communication of an alert to a user of the system.

5. The system of claim 1, wherein the wireless receiver module prevents disconnection of the wireless power transfer link between the wireless transmission module and the wireless receiver module by disabling foreign object detection.

6. A method, comprising, in a system including a wireless transmission module configured to transmit electrical energy to a wireless receiver module via reverse wireless charging, one or more electronic components other than the wireless transmission module, and a battery configured to provide electrical energy to the wireless transmission module and the one or more electronic components:

determining an amount of power demanded by the wireless transmission module and the one or more electronic components from the battery;

dynamically varying power transfer from the wireless transmission module to the wireless receiver module as a function of the amount of power demanded by the one or more electronic components;

reducing power transfer from the wireless transmission module to the wireless receiver module when the amount of power demanded by the one or more electronic components increases above a configurable power limit; and causing the wireless transmission module to communicate a message to the wireless receiver module indicating that power transfer from the wireless transmission module to the wireless receiver module is reduced;

wherein responsive to the message, the wireless receiver module prevents disconnection of the wireless power transfer link between the wireless transmission module and the wireless receiver module by disabling a state of the system relating to sudden change in power.

7. The method of claim 6, wherein responsive to the message, the wireless receiver module prevents communication of an alert to a user of the system.

8. The method of claim 6, wherein the wireless receiver module prevents disconnection of the wireless power transfer link between the wireless transmission module and the wireless receiver module by disabling foreign object detection.

9. The method of claim 6, further comprising:

receiving telemetry information regarding the battery; and setting the configurable power limit based on the telemetry information.

10. The method of claim 9, wherein the telemetry information comprises one or more of a state of charge of the battery, a state of health of the battery, a temperature associated with the battery, a daily depth of discharge of the battery, a charging rate of the battery, a discharging rate of the battery, a storage capacity of the battery, an energy density of the battery, a specific power of the battery, a cell voltage of the battery, a cycle life of the battery, and a round-trip efficiency of the battery.

* * * * *